(12) United States Patent
Malatesta

(10) Patent No.: US 10,384,896 B2
(45) Date of Patent: Aug. 20, 2019

(54) MAIL PROCESSING SYSTEM AND METHOD WITH INCREASED PROCESSING SPEED

(71) Applicant: Tritek Technologies, Inc., Wilmington, DE (US)

(72) Inventor: James Malatesta, Hockessin, DE (US)

(73) Assignee: TRITEK TECHNOLOGIES, INC., Wilmington, DE (US)

( * ) Notice: Subject to any disclaimer, the term of this patent is extended or adjusted under 35 U.S.C. 154(b) by 0 days.

(21) Appl. No.: 15/765,899

(22) PCT Filed: Apr. 28, 2017

(86) PCT No.: PCT/US2017/030152
§ 371 (c)(1),
(2) Date: Apr. 4, 2018

(87) PCT Pub. No.: WO2017/190022
PCT Pub. Date: Nov. 2, 2017

(65) Prior Publication Data
US 2018/0297082 A1    Oct. 18, 2018

Related U.S. Application Data

(60) Provisional application No. 62/328,982, filed on Apr. 28, 2016.

(51) Int. Cl.
*B65H 7/20* (2006.01)
*B65H 1/02* (2006.01)
(Continued)

(52) U.S. Cl.
CPC .............. *B65H 7/20* (2013.01); *B07C 1/025* (2013.01); *B07C 1/04* (2013.01); *B07C 1/10* (2013.01);
(Continued)

(58) Field of Classification Search
CPC . B65H 1/02; B65H 1/025; B65H 1/14; B65H 3/045; B65H 3/12; B65H 3/124;
(Continued)

(56) References Cited

U.S. PATENT DOCUMENTS 5,246,223 A * 9/1993 Ricciardi ............... B65H 1/025
271/149
5,988,635 A * 11/1999 Ohshima ................. B65H 5/06
271/109

(Continued)

FOREIGN PATENT DOCUMENTS

EP            2495194 A2    9/2012

OTHER PUBLICATIONS

The United States Postal Service, An Introduction to Mailing for Business and Organizations, "Understanding Your Mailpiece Shape" http/www.publicationprinters.com/Files/dmm200.pdf, (pp. 16-17), May 2008.
(Continued)

*Primary Examiner* — Prasad V Gokhale
(74) *Attorney, Agent, or Firm* — Devlin Law Firm LLC; James M. Lennon

(57) ABSTRACT

A mail singulator system determines a position of an optical panel to automatically adjust a loading conveyor speed to prevent stacked and overlapped mailpieces in the singulator and large gaps between mailpieces. The optical panel is configured between the front mailpiece of a mail stack on the loading conveyor and the optical sensor. The optical panel changes position with the pressure exerted by the mail stack and provides signals to the controller to adjust the conveyor speed. An optical sensor may detect a far threshold position or limit distance to increase the speed of the conveyor and may detect a near threshold position of limit distance to reduce the speed of the conveyor. The optical panel may
(Continued)

have a low friction surface to allow the mail to slide into the conveyor and an optical surface to allow reliable optical sensor detection of the optical panel position.

19 Claims, 6 Drawing Sheets

(51) Int. Cl.
| | |
|---|---|
| B65H 3/12 | (2006.01) |
| B07C 1/04 | (2006.01) |
| B65H 3/04 | (2006.01) |
| B65H 7/14 | (2006.01) |
| B07C 1/02 | (2006.01) |
| B07C 1/10 | (2006.01) |
| B65H 5/06 | (2006.01) |
| G06K 9/00 | (2006.01) |
| G06K 9/20 | (2006.01) |
| B65H 5/02 | (2006.01) |
| B65H 7/02 | (2006.01) |
| B65H 3/52 | (2006.01) |

(52) U.S. Cl.
CPC .............. *B65H 1/025* (2013.01); *B65H 3/045* (2013.01); *B65H 3/124* (2013.01); *B65H 3/5246* (2013.01); *B65H 5/023* (2013.01); *B65H 5/062* (2013.01); *B65H 7/02* (2013.01); *B65H 7/14* (2013.01); *G06K 9/00201* (2013.01); *G06K 9/2054* (2013.01); *B65H 2404/2691* (2013.01); *B65H 2511/22* (2013.01); *B65H 2513/10* (2013.01); *B65H 2553/42* (2013.01); *B65H 2701/1916* (2013.01)

(58) Field of Classification Search
CPC ... B65H 7/02; B65H 7/04; B65H 7/14; B65H 7/18; B65H 7/20; B65H 43/02; B65H 2405/20; B65H 2513/10; B65H 2513/102; B65H 2513/104; B65H 2513/106; B65H 2513/108

See application file for complete search history.

(56) References Cited

U.S. PATENT DOCUMENTS

| | | | |
|---|---|---|---|
| 2002/0053768 A1 | 5/2002 | Blackwell et al. | |
| 2003/0052444 A1 | 3/2003 | Luebben et al. | |
| 2008/0056878 A1* | 3/2008 | Schererz | B65H 31/06 414/802 |
| 2015/0091241 A1* | 4/2015 | Wakakusa | B65H 3/44 271/9.07 |
| 2015/0368056 A1* | 12/2015 | Murata | B65H 7/04 271/259 |
| 2016/0313117 A1* | 10/2016 | Pearcey | G01C 3/02 |
| 2016/0355360 A1* | 12/2016 | Shin | B65H 5/06 |

OTHER PUBLICATIONS

European Extended Search Report issued in EP Application No. 17790553.6, dated Mar. 7, 2019, 6 pages.

* cited by examiner

MAIL PROCESSING SYSTEM AND METHOD WITH INCREASED PROCESSING SPEED

CROSS REFERENCE TO RELATED APPLICATIONS

This application is a national stage entry application under 35 U.S.C. 371 of International Patent Application No. PCT/US2017/030152, filed on Apr. 28, 2017, which claims the benefit of priority to U.S. Provisional Patent Application No. 62/328,982, filed on Apr. 28, 2016; the entireties of which are hereby incorporated by reference herein.

BACKGROUND OF THE INVENTION

Field of the Invention

The invention relates generally to mail processing systems and conveyor systems, which are described generally in the prior art, including U.S. Pat. Nos. 7,303,188; 7,361,861; 7,777,919; 8,162,214; 5,226,547; 5,398,922; 5,521,365; 5,544,758; 6,523,697; 6,571,958; 6,651,878; and 7,185,748. Specifically, the invention relates to mail singulator systems having an automatic conveyor speed adjustment for a loading conveyor portion of said mail singulator system.

Background

Mail singulator systems or conveyor systems typically employ a loading conveyor that feeds a mail stack or packages to a singulator feeder. When the pressure of the mail stack is too high, the singulator may feed mailpieces that are stacked or overlapped, sometimes called double-feeding. Some systems utilize an optical device to determine the position of a front mailpiece in the mail stack and control the speed of the loading conveyor based on the distance of the front mailpiece from the optical device. Unfortunately, mailpieces vary in color and texture, may include stamps, logos, and print of various colors and materials, and many have transparent windows for viewing an address. All of these variations in mailpiece surfaces can make it difficult for the optical sensor to determine reliably a position of or distance to the front mailpiece, leading to double-feeding, i.e., stacked and overlapped mailpieces being advanced by the singulator. Likewise, when mailpieces get too far away, there may be gaps in the mailpieces drawn by the singulator, thereby slowing the overall speed of the system and reducing efficiency.

SUMMARY OF THE INVENTION

The invention is directed to a mail singulator system having an automatic loading conveyor speed adjustment. A loading conveyor moves a mail stack toward a singulator that draws the front mailpiece away from the mail stack. It is to be understood that the terms "mail stack" and "mailpiece" as used herein may refer to any or all of flat mail, parcel packages, and single sheets of paper. A singulator is designed to provide a flow of individual mailpieces moving along the singulator. A singulator may comprise a belt and rollers that advance the front mailpiece from the mail stack. The pressure of the mail stack against the singulator can cause the singulator to feed stacked mailpieces, wherein two mailpieces are advanced one atop the other, or overlapping to some degree. This issue, also known as double-feeding, can result from inconsistent levels of pressure of the mail stack against the singulator, creating too much friction between mailpieces. The issue of double-feeding may be exacerbated when mailpieces consist of high friction material such as plastic wrapping, which causes the mailpieces to stick to one another if too much pressure is applied to the mail stack.

To avoid this problem, an optical panel or paddle is configured between the front mailpiece and an optical sensor. The mail stack presses against the optical panel and the optical sensor determines a position of the optical panel to provide a signal to a controller to adjust the loading conveyor speed. When the pressure of the mail stack on the optical panel is too high, the optical panel will move closer to the optical sensor thereby triggering the controller to reduce the speed of the loading conveyor, or stop the loading conveyor. When the pressure of the mail stack on the optical panel is too low, the optical panel will move further away from the optical sensor thereby triggering the controller to increase the speed of the loading conveyor.

An exemplary optical panel has a mail contact surface and an optical surface. The mail contact surface may be a low friction surface to aid in the singulator advancing the front mailpiece. The static coefficient of friction of the mail contact surface with paper may be no more than about 0.5, and preferably no more than 0.4 and even more preferably no more than 0.3 using ASTM D 1894, with the optical panel being stationary and standard notebook paper configured on the sliding block. The kinetic coefficient of friction of the mail contact surface with paper may be no more than about 0.4, and preferably no more than 0.3 and even more preferably no more than 0.15 using ASTM D 1894, with the optical panel being stationary and standard notebook paper configured on the sliding block. The optical surface may be a specific color, texture and/or sheen to allow reliable position determination by the optical sensor. The optical surface may be non-reflective, or have a low sheen, to allow the optical sensor to determine accurately the optical panel position.

Each of these characteristics of the optical panel allow the optical sensor to more reliably determine the position of the optical panel and therefore the mail stack. The optical panel allows for reliable processing of mailpieces in various colors and textures and including stamps, logos, and print of various colors and materials. Additionally, the optical panel allows for reliable processing of mailpieces with transparent windows for viewing an address or plastic wrap, each of which can create glare, making it more difficult for an optical sensor to reliable determine position. Additionally, plastic windows and/or wrap on mailpieces may create static electricity files that may interfere with the optical sensor, which the optical panel alleviates. The optical panel further improves the processing of mailpieces of difference sizes and dimensions because it may overlap with both the optical sensor and the singulator belt or may overlap with only the optical sensor, thereby allowing the processing of smaller mailpieces, e.g., postcards, that would otherwise be large enough to come into contact only with the singulator belt and would not be detected by the optical sensor.

An exemplary optical sensor may be configured as a proximity sensor and determine when the optical panel is within a near threshold position and when the optical panel moves beyond this near threshold position. The optical sensor may send a signal to a controller when the optical panel moves closer to the optical sensor, or within the near threshold position to reduce the speed of the loading conveyor. The optical sensor may send a signal to a controller when the optical panel moves away from the optical sensor, or past the near threshold position to increase the speed of the loading conveyor. An exemplary optical sensor may measure a gap distance to the optical panel or the optical surface of the optical panel. A controller may be configured to increase the speed of the conveyor when the gap distance is greater than a far threshold distance and reduce the speed when the gap distance is below a near threshold distance. A controller may be configured to change the speed of the conveyor based on the gap distance, wherein the speed changes with incremental changes in the gap distance, thereby preventing the optical panel from moving outside of the near and far threshold distances.

An exemplary optical panel is configured between the optical sensor and the front mailpiece. The front mailpiece is pressed against optical panel and the pressure of the mail stack changes the position of the optical panel. An optical panel may be a flexible piece of material that changes position by flexing due to the mail stack pressure. An exemplary optical panel may have an extend end that extends in front of the mail stack and have a secured or fixed end that is configured outside of the mail stack contact area. A position adjustment feature may be coupled with the optical panel to adjust the position of the optical panel and/or the amount of force required to change the optical panel position. For example, a spring may be coupled to the optical panel and either moved in position with respect to the optical panel or adjusted in tension to change how much force is require to change the position of the optical panel. A spring may extend substantially normal to the optical panel or may be a torsional spring that is configured along a fixed end of the optical panel.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
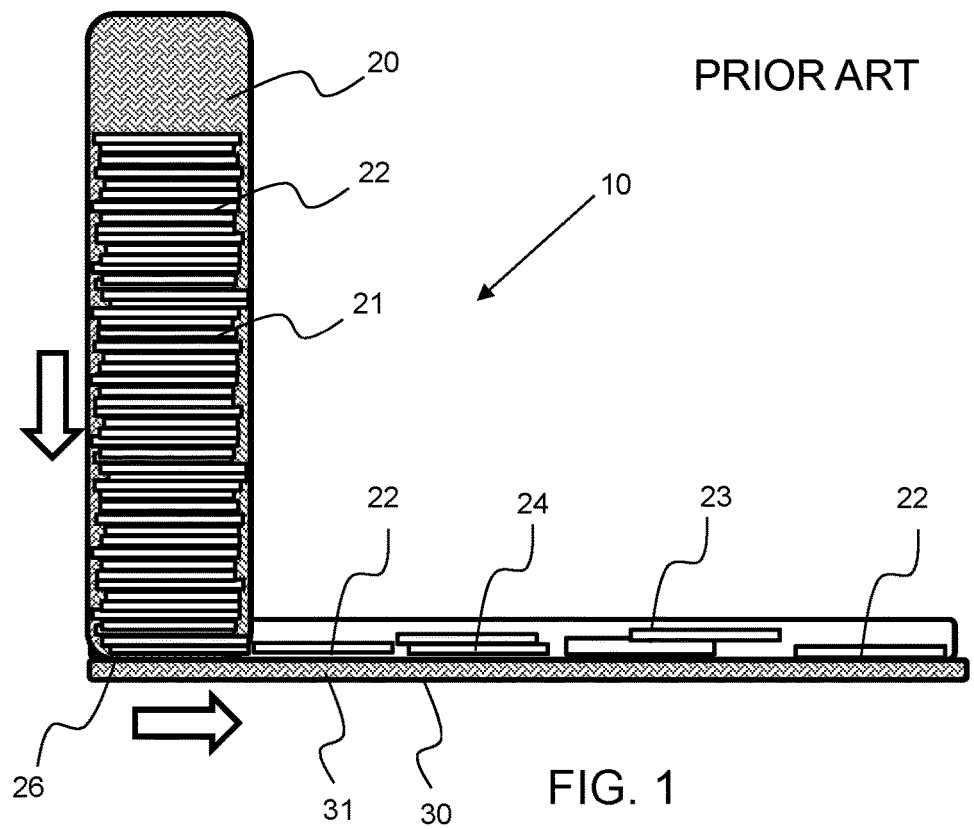
FIGS. 1 and 2 show top views of a standard singulator system.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Figure 2:
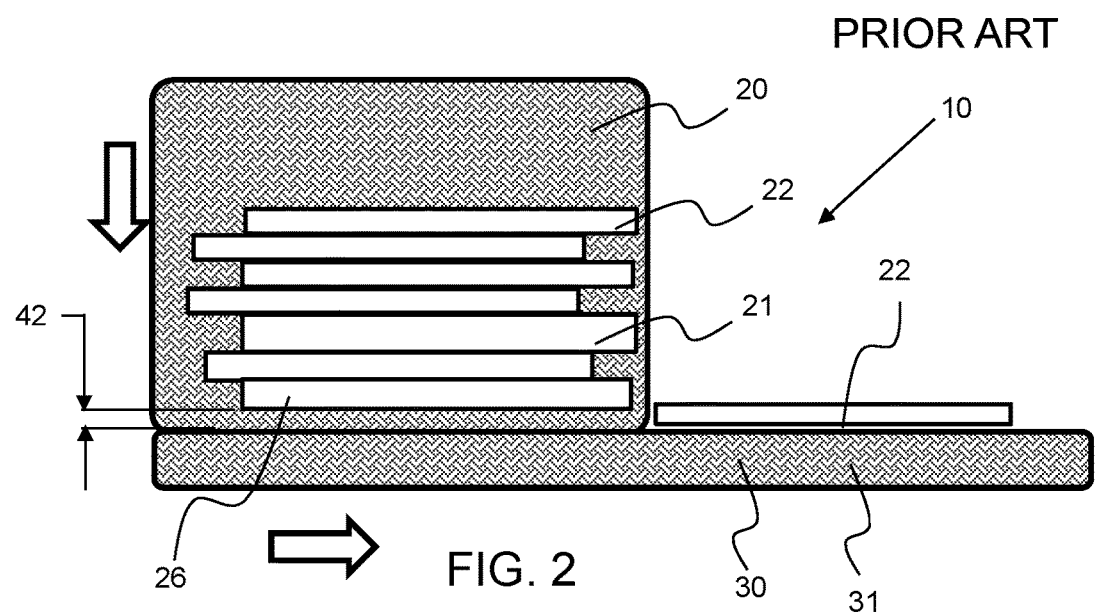

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention, As shown in FIGS. 1 and 2, a standard singulator system has a loading conveyor 20 that advances a mail stack 21 comprising a plurality of mailpieces 22 toward a singulator 30, such as a singulator belt 31. The mail in FIG. 1 is stacked 24 and overlapped 23 on the singulator due to the high pressure from the loading conveyor. As shown in FIG. 2, there is a gap between the front mailpiece 26 and the singulator due to the low speed of the loading conveyor. This will result in gaps in the mailpieces being fed along the singulator and will reduce system speed and efficiency.

Figure 3:
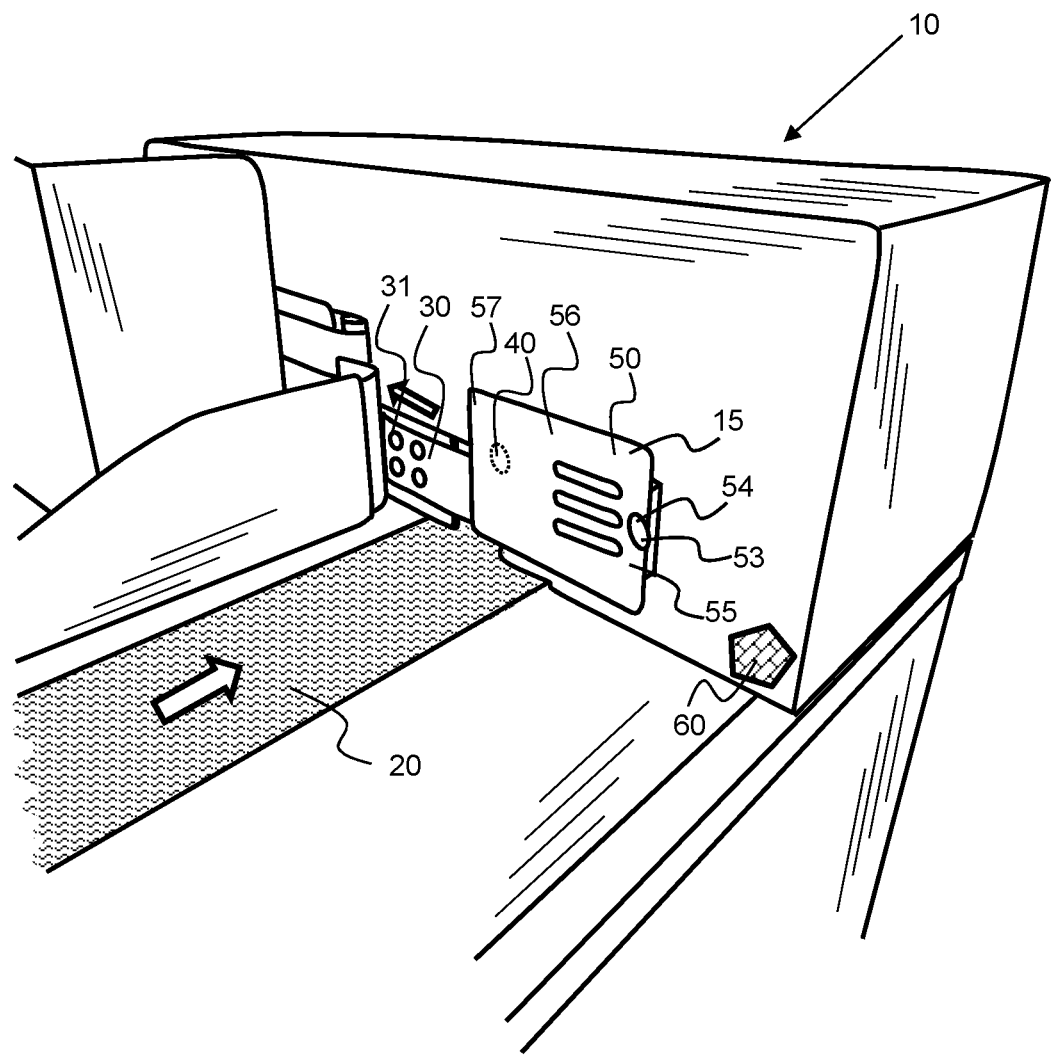
FIG. 3 shows a perspective view of an exemplary mail singulator system having an optical sensor behind the optical panel.
Figure 4:
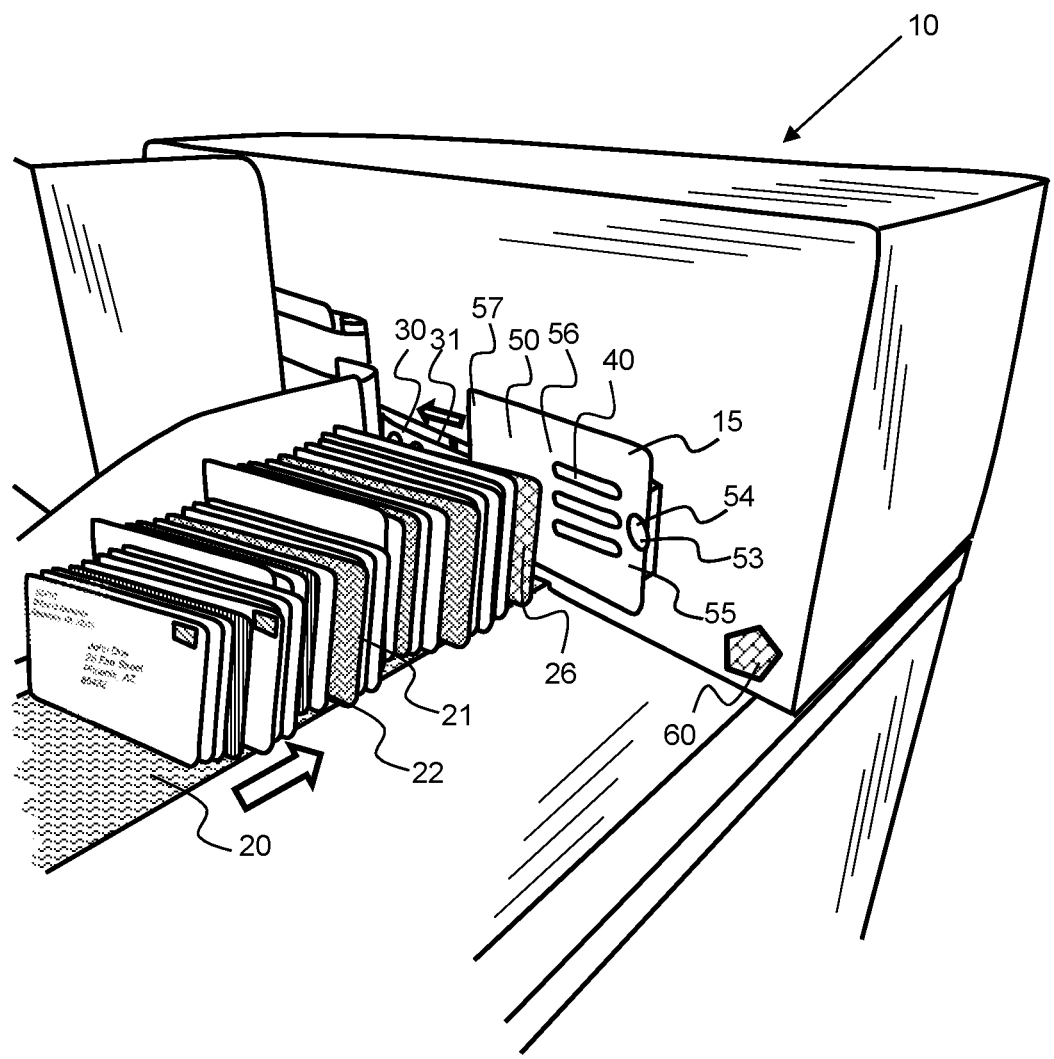
FIG. 4 shows a perspective view of an exemplary mail singulator system having a mail stack pressing against the mail contact surface of the optical panel.

Referring to FIGS. 3 and 4, an exemplary mail singulator system 10 has an optical sensor 40 behind an optical panel 50. The loading conveyor 20 advances mail towards the optical panel to be drawn away by the singulator 30. The singulator belt 31 advances the mailpieces in a substantially perpendicular direction, such as within about 15 degrees, from the advancing direction of the loading conveyor, as shown by the bold arrows in FIG. 3. The mail contact surface 56 of the optical panel may be a low friction surface, as described herein, to allow the front mailpiece 26 to be easily drawn from the mail stack 21 by the singulator 30. The optical panel is a planar piece having a planar mail contact surface 56 and a planar optical surface. The optical panel has a fixed end 55 that is outside of the mail stack contact with the optical panel and an extended end 57 that extends in front of the mail stack. The mail stack presses on the optical panel to cause it to deflect or pivot from the fixed end. An optical panel 50 may pivot about a panel pivot 54. In an exemplary embodiment, a position adjustment feature 53 enables a user to change a deflection resistance of the optical panel. In an exemplary embodiment, when the optical panel 50 moves beyond a far threshold position, the controller 60 increases the speed of the loading conveyor which advances the mail stack. In an exemplary embodiment, when the optical panel 50 moves within a near threshold position, the controller 60 reduces the speed of the loading conveyor to prevent stacking and overlapping of mailpieces in the singulator. In an exemplary embodiment, the optical sensor measures a gap distance to optical surface of the optical panel, and if this gap distance is below a near threshold limit, the controller 60 will slow down or stop the loading conveyor 20 to prevent stacking and overlapping of mail in the singulator. In an exemplary embodiment, if the gap distance measured by the optical sensor to the optical surface of the optical panel is above a far threshold limit, the controller 60 will advance or increase the speed of the loading conveyor 20 to prevent low processing speeds.

Figure 5:
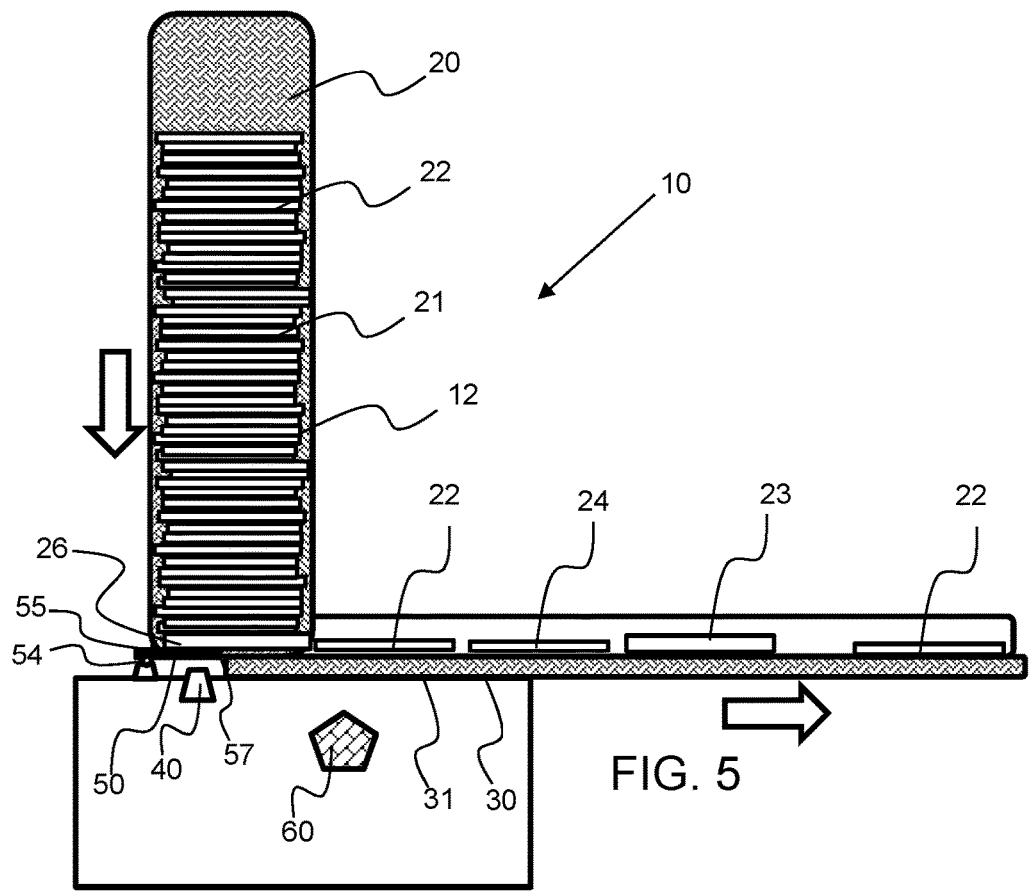
FIG. 5 shows a top view of an exemplary mail singulator system having an optical sensor behind the optical panel and the front mailpiece pressing on the optical panel.

As shown in FIG. 5, an exemplary mail singulator system 10 has an optical sensor 40 behind the optical panel 50 and the front mailpiece is pressing on the optical panel to change a position of the optical panel. The optical sensor determines a position of the optical panel and may measure a gap distance 42 between the optical sensor and the optical panel, in an exemplary embodiment, the controller adjusts the speed of the loading conveyor 20 to provide a steady stream of mail in the singulator without stacking or overlapping of the mail.

Figure 6:
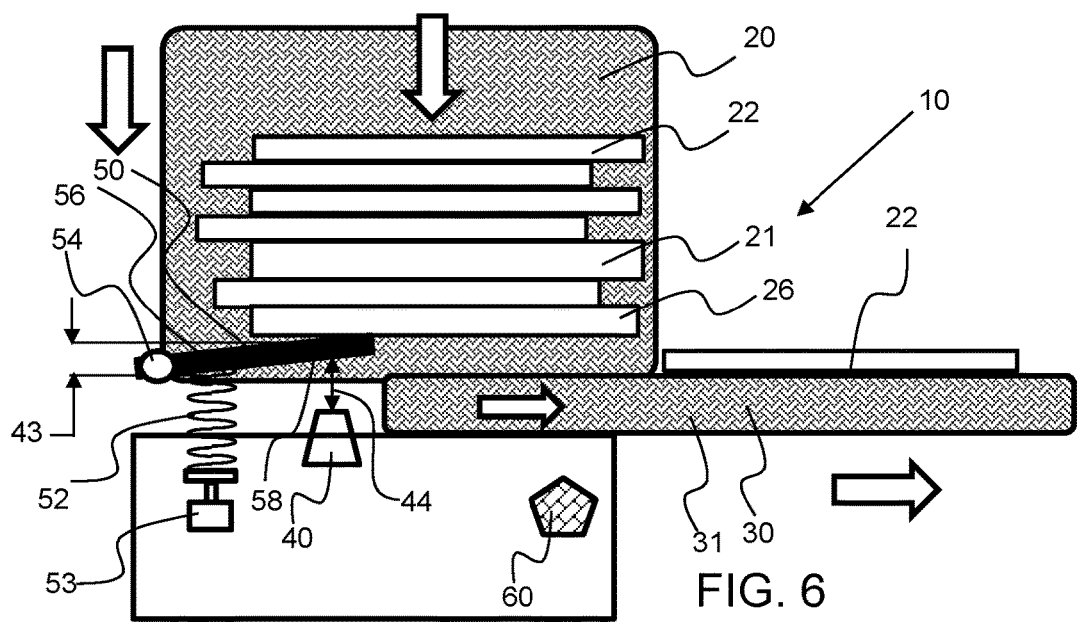
FIG. 6 shows a top view of an exemplary mail singulator system having a gap distance from the optical sensor to the optical surface of the optical panel and wherein the gap distance is above an upper threshold limit.

As shown in FIG. 6, the optical panel is beyond a far threshold position as determined by the gap distance 44 to the optical panel. The optical sensor may send a signal to the controller 60 and the controller may in turn increase the speed of the loading conveyor to advance the mail stack 21 and reduce the gap distance 44. In an exemplary embodiment, the optical sensor measures the gap distance 44 and provides a signal to the controller of the gap distance and/or when the gap distance is greater than a far threshold limit or within a near threshold limit. The mail singulator system 10 may be configured to automatically adjust the speed of the loading conveyor to keep the gap distance within these far and near threshold limits. As shown in FIG. 6, the gap distance 44 from the optical sensor 40 to the optical surface 58 of the optical panel 50 is above an upper threshold limit and the controller 60 is changing the speed of the loading conveyor 20 to advance the front mailpiece 26 toward the singulator 30. The mail gap distance 43, or the distance from the front mailpiece to the singulator, is too large and mail may stop being drawn out by the singulator if the speed of the loading conveyor is not increased. A spring 52 is shown as being coupled to the optical panel to adjust the force required to deflect the optical panel. A position adjustment feature 53 may be an adjustment of the position of the spring 52, wherein the spring may be pressed closer to the optical panel, thereby pre-com pressing the spring and requiring a higher load to deflect the spring further. The optical panel 50 pivots about panel pivot 54. An optical panel may be a flexible and resilient material, such as a plastic panel or sheet and may simply have a fixed end to allow the extended end to flex and deflect from the pressure of the mail stack.

Figure 7:
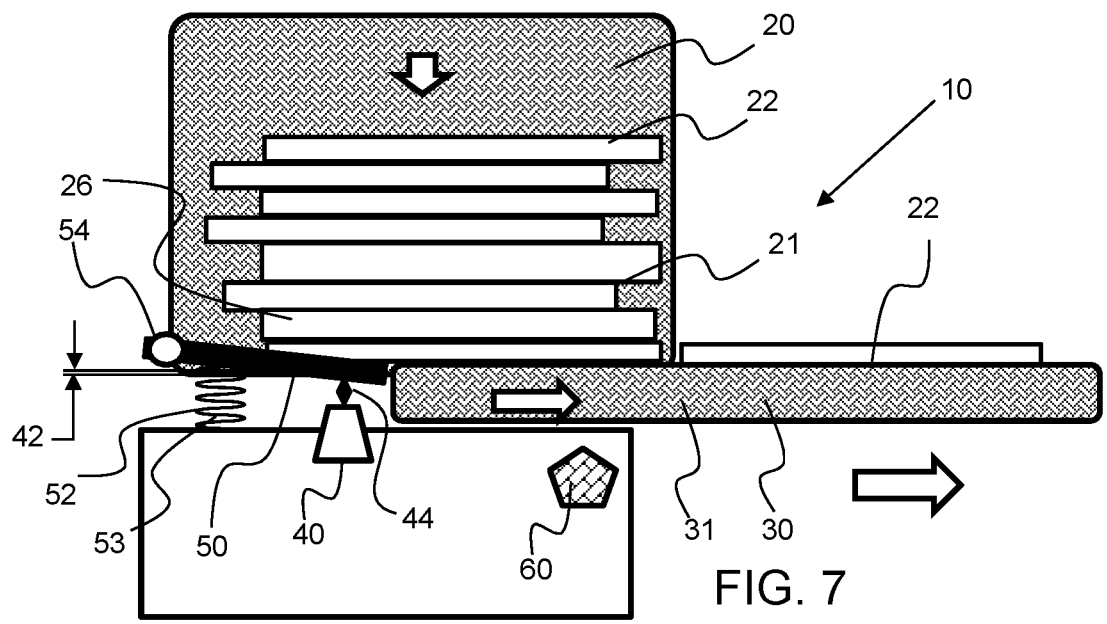
FIG. 7 shows a top view of an exemplary mail singulator system having a gap distance from the optical sensor to the optical surface of the optical panel and wherein the gap distance is below a lower threshold limit.

As shown in FIG. 7, an exemplary mail singulator system 10 has a gap distance 44 from the optical sensor 40 to the optical surface 58 of the optical panel 50. The optical panel is within a near threshold position, or the gap distance is below a near threshold limit, and the optical sensor 40 sends a signal to the controller 60 and the controller reduces the speed of the loading conveyor 20, or temporarily stops the conveyor to prevent stacked and overlapping mailpieces in the singulator due to high pressure from the mail stack 21.

Figure 8:
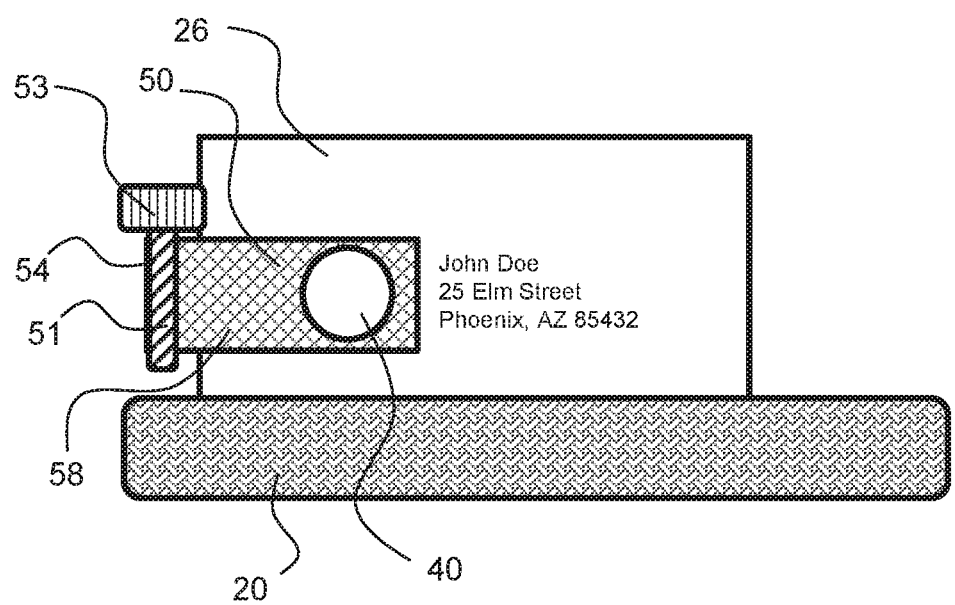
FIG. 8 shows back view of an optical panel apparatus and a front mailpiece pressing against the optical panel.

As shown in FIG. 8, an optical panel apparatus 15 comprises an optical panel 50 and an optical sensor 40 to determine a position of the optical panel. The position of the optical panel changes due to the pressure of the mail stack and front mailpiece 28 pressing against the optical panel. The optical sensor 40 is measuring the gap distance to the optical surface 58 of the optical panel. The optical panel pivots about panel pivot 54. The position adjustment feature 53 comprises a torsional spring 51 that controls the resistance of the optical panel to pivot about the pivot.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A mail singulator system comprising:
    a) a loading conveyor configured to advance a mail stack comprising a plurality of mailpieces having a front mailpiece;
    b) a controller;
    c) an optical panel apparatus comprising:
        i) an optical panel;
        ii) a mail contact surface;
        iii) a planar optical surface that is a fixed color and sheen to allow reliable position determination by an optical sensor; and
        iv) a position adjustment feature that adjusts an amount of force required to change a gap distance between the optical panel and said optical sensor;
            said force exerted on the optical panel by a front mailpiece;
            wherein the optical panel is a flexible sheet of material;
    d) said optical sensor that determines a position of the optical panel with respect to the optical sensor;
        wherein the optical panel is configured between the front mailpiece and the optical sensor;
        wherein the controller changes a loading conveyor speed based on the position of the optical panel.

2. The mail singulator system of claim 1, wherein when the optical panel moves beyond a far threshold position from the optical sensor the controller increases the loading conveyor speed.

3. The mail singulator system of claim 1, wherein when the optical panel moves within a near threshold position from the optical sensor the controller reduces the loading conveyor speed.

4. The mail singulator system of claim 1, wherein the optical sensor detects a gap distance to the optical panel and wherein the controller increases the speed of the loading conveyor when the gap distance exceeds a far threshold limit.

5. The mail singulator system of claim 1, wherein the optical sensor detects a gap distance to the optical panel and wherein the controller decreases the speed of the loading conveyor when the gap distance is below a near threshold limit.

6. The mail singulator system of claim 1, wherein the optical sensor detects a gap distance to the optical panel and wherein the controller stops the loading conveyor when the gap distance is below a near threshold limit.

7. The mail singulator system of claim 1, wherein the optical panel is a flexible material that flexes to change the gap distance.

8. The mail singulator system of claim 1, wherein the optical panel is a sheet of plastic.

9. The mail singulator system of claim 1, wherein the position adjustment feature comprises a spring.

10. The mail singulator system of claim 9, wherein the spring has a length axis extending substantially perpendicularly from the optical panel surface.

11. The mail singulator system of claim 9, wherein the spring of the optical panel apparatus is a torsional spring and the optical panel pivots about said torsional spring to keep the optical pane in contact with the front mailpiece.

12. The mail singulator system of claim 1, wherein the optical panel extends over only a portion of the front mailpiece.

13. The mail singulator system of claim 1, wherein the mail contact surface of the optical panel is a low friction material, having a coefficient of friction of no more than 0.3 with respect to contact with paper.

14. The mail singulator system of claim 1, wherein the optical surface of the optical panel is a non-reflective material.

15. The mail singulator system of claim 1, wherein the singulator comprises a belt to advance the front mailpiece from the mail stack.

16. The mail singulator system of claim 15, wherein the belt of the singulator is configured substantially perpendicular to the loading conveyor.

17. A method of controlling a mail singulator system comprising the steps of:
   a) providing a mail singulator system comprising:
      i) a loading conveyor configured to advance a mail stack comprising a plurality of mailpieces having a front mailpiece;
      ii) a controller;
      iii) an optical panel apparatus comprising:
         1) an optical panel;
         2) a mail contact surface;
         3) a planar optical surface that is a fixed color and sheen to allow reliable position determination by an optical sensor; and
         4) a position adjustment feature that adjusts an amount of force required to change a gap distance between the optical panel and said optical sensor; said force exerted on the optical panel by a front mailpiece;
      iv) said optical sensor that determines a position of the optical panel with respect to the optical sensor;
      wherein the optical panel is configured between the front mailpiece and the optical sensor; and
      wherein the optical panel is a flexible sheet of material;
   b) advancing said loading conveyor with said mail stack to advance a front mailpiece toward the optical panel;
   c) automatically changing with the controller the loading conveyor speed based on the position of the optical panel.

18. The method of controlling a mail singulator system of claim 17, wherein when the optical panel moves beyond a far threshold position from the optical sensor the controller increases the loading conveyor speed.

19. The method of controlling a mail singulator system of claim 17, wherein when the optical panel moves within a near threshold position from the optical sensor the controller reduces the loading conveyor speed.

* * * * *